A. BRANDT.
Rock-Boring Machine, Hydraulic.
No. 200,024. Patented Feb. 5, 1878.
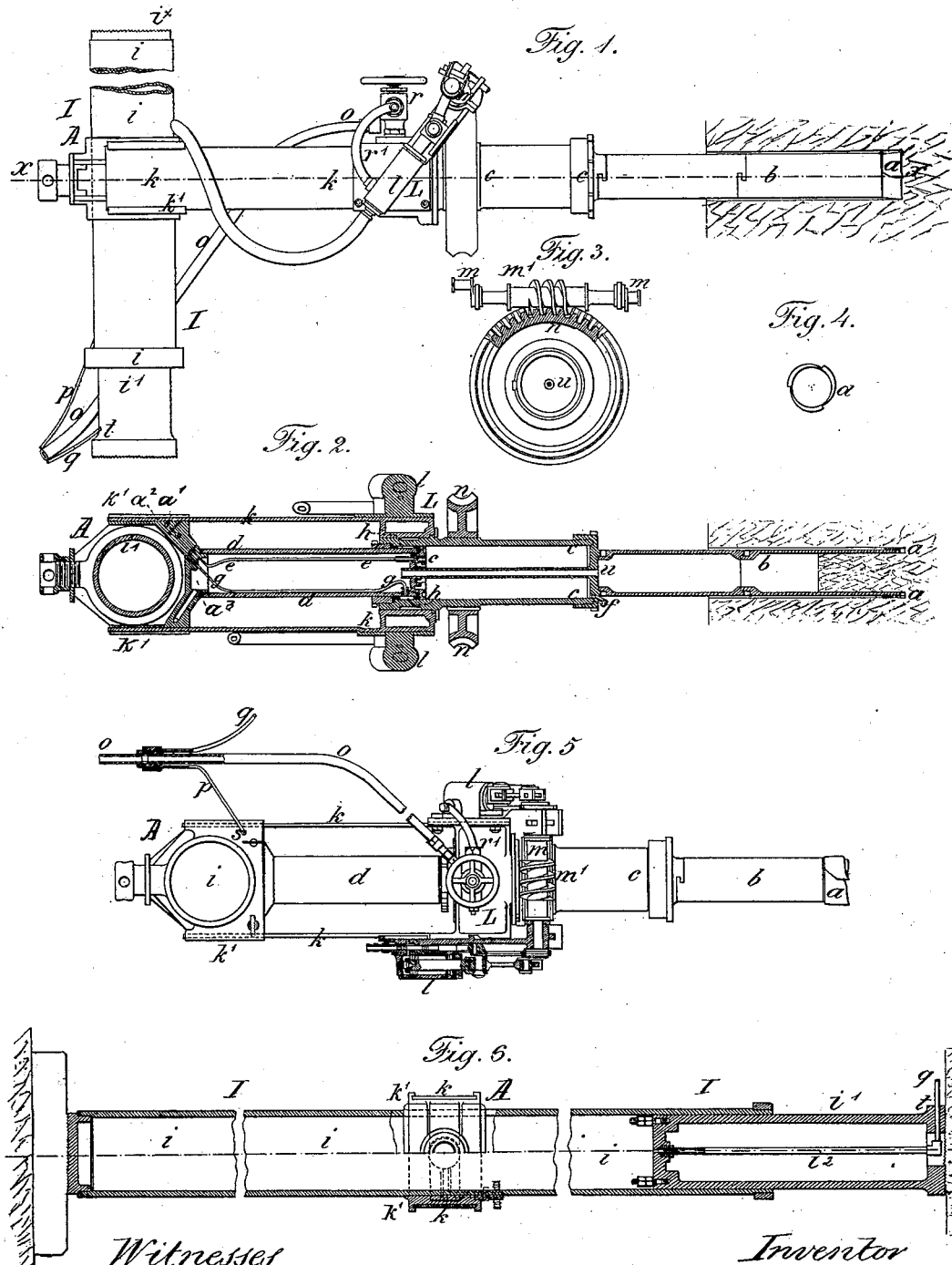

UNITED STATES PATENT OFFICE.

ALFRED BRANDT, OF EBENSEE, AUSTRIA.

IMPROVEMENT IN ROCK-BORING MACHINES (HYDRAULIC.)

Specification forming part of Letters Patent No. 200,024, dated February 5, 1878; application filed October 2, 1877.

*To all whom it may concern:*

Be it known that I, ALFRED BRANDT, of Ebensee, in Austria, have invented certain new and useful Improvements in Rock-Boring Apparatus, of which the following is a specification:

My invention relates to hydraulic machinery for boring or working rock or other material, and in stands or supports for such machinery; and consists, essentially, in the use of hydraulic power for pressing a toothed steel boring tool and tube into the rock, and for simultaneously rotating the said tool. The waste-water passing from the engine is used for keeping the cutting-edges of the boring-tool constantly cool, and for washing out the bored hole a firm abutment for the boring-engine is formed by a hydraulic press, consisting of a hydraulic cylinder and piston forced against the top and bottom or against the sides of the rock.

In the accompanying drawings, Figure 1 is a side view of the boring apparatus and hydraulic stand. Fig. 2 is a longitudinal horizontal section of the same on line $x\ x$ of Fig. 1. Fig. 3 is a view of the worm-wheel and worm for rotating the boring-tool. Fig. 4 is a front view of the boring-tool. Fig. 5 is a top view of the boring apparatus with one of its two hydraulic engines in section, and Fig. 6 is a longitudinal section of the hydraulic stand.

In the drawings the same letters of reference are employed in all the figures to denote corresponding parts wherever such may occur.

I is a hydraulic stand or support for the boring mechanism, consisting of the cylinder $i$, closed at one end, its outer face being serrated or roughened, as shown at $i^x$, and of the hollow piston $i^1$, provided with an induction-pipe, $i^2$, emerging from the piston at $t$, where it is coupled to a supply-pipe, $q$, through which water under pressure is fed to the cylinder $i$, to force the cylinder and piston against the sides or against the roof and floor of a tunnel where the boring is effected. The face of the head of the piston, like that of the cylinder, is also roughened or serrated for the purpose of affording better hold upon the rock or other material to be bored, as shown in Figs. 1 and 6.

A is a sleeve, bolted or otherwise secured to the cylinder $i$. This sleeve is provided with ports $a^1\ a^2$, for a purpose hereinafter explained.

$d$ is a hollow fixed piston, secured to the sleeve or head A in any convenient or preferred manner, preferably by providing the head A with a tubular screw-threaded projection, $a^3$, upon which the piston $d$ is screwed, as shown in Fig. 2.

$k\ k$ are two guides, sliding in brackets or slides $k'\ k'$ formed on or bolted to the sides of the head A. These guides are connected with a hollow casing, L, the interior of which is tubular, and serves as a support for the two hydraulic engines $l$, of any usual construction, and mounted one on each side of the apparatus. The casing itself is mounted upon the pressure-cylinder $c$, and slides to and fro with it, allowing said cylinder to revolve freely. The latter is mounted on the piston $d$, so as to revolve freely and slide to and fro upon said piston, the construction and arrangement of cylinder and piston being such as to form an annular space, $h$, between them, into which space $h$ water under pressure is constantly present during the operation of the machine, being fed thereto through pipe $g$ for the purpose of lubricating, as well as for providing a water-cushion to facilitate the sliding to and fro of said cylinder $c$, together with the engines and boring-tool, as will be presently explained.

The engines $l\ l$ are coupled together by means of a double crank-shaft, $m$, carrying a worm, $m'$, which meshes with a worm-wheel, $n$, mounted upon the cylinder $c$, as shown by Figs. 3 and 5, and which serve to impart a rotary motion to said cylinder $c$, which is further provided with a central tube, $u$, through which the waste-water from the engines passes into the hollow boring-rod $b$ and boring-tool $a$, where it escapes into and from the bore. In this manner the boring-tool is kept constantly cool, while the bore is kept clear of all material.

The cylinder $c$ is further provided with a pipe, $f$, having a suitable valve or stop-cock, which serves to eject the water from the cylinder when it is desired to cause it to slide backward to withdraw the boring-rod from the bore.

The rotation of the boring-tool, as well as its pressure against the material to be bored, is effected by the cylinder $c$, the former by means of the worm and worm-wheel actuated by the hydraulic engines, and the latter, by means of water under pressure, being forced into the cylinder through pipes $e\ p\ o$, as more fully explained hereinafter.

$b$ is the tubular sectional boring-rod, consisting of a series of tubes connected together, in any preferred manner, either by screwing them one to the other or by means of bayonet-joints, as shown, the number of sections employed depending necessarily upon the depth of the bore, which may be very great, as the boring has to withstand only the action of torsion, and may therefore be made of considerable length.

$a$ is the boring-tool, consisting of an annular steel ring, the outer face of which is provided with a series of cutting-teeth hardened for this purpose. The boring-tool $a$ may be screwed upon the boring-rod $b$, or connected therewith by means of a bayonet-joint, the sections of said rod $b$ being so arranged that the boring-tool may be connected with either of them.

The power to work the apparatus is applied in the following manner and by the following means: $p\ q$ are flexible tubes diverging from one main supply-pipe, $o$, which latter supplies the necessary water under pressure from any suitable hydraulic-pressure engine.

The pipes $p\ q$ are connected to pipe $o$ by means of a suitable coupling or couplings, provided with valves or stop-cocks; and the pipe $o$ consists of a series of sections coupled together, the number of sections employed depending upon the distance of the apparatus from the supply.

The outer end of pipe $o$ is coupled to a valve, $r$, having flexible branches $r'\ r''$, which feed the water under pressure to the hydraulic engines $l$ for rotating the cylinder $c$, and with it the boring-rod $b$ and tool $a$.

The pipe $p$ is connected at one end with the port $a^1$ in the sleeve or head A, and supplies water under pressure to the cylinder $c$ through pipe $e$, to force the cylinder and boring rod and tool against the material operated upon; and $g$ is another tube connected with port $a^2$, through which water is forced into the annular space $h$, for a purpose already explained, while the tube $q$ is connected with the central tube or pipe $i^2$ at $t$, to conduct water into the cylinder $i$, for a purpose above explained.

Thus, when the apparatus is in working position, and water is admitted through pipe $o$, first into pipe $q$, the piston $i^1$ and cylinder $i$ are forced out against the sides or the roof and floor, as the case may be, of the rock or tunnel. Water being then admitted into $p$ and the valve $r$ opened, the engines $l$ will rotate the cylinder $c$, the boring-rod, and boring-tool, while the cylinder $c$ and its attachments are forced against the rock by the water supplied to cylinder $c$ through pipe $e$, and the annular space $h$ being at the same time supplied with water through pipe $g$, the ports $a^1\ a^2$ being in communication with each other, the waste-water from the engines passing through $u$ into the boring-rod, and from thence into the bore, as stated.

The average water-pressure may be calculated at fifty atmospheres, and the boring-tool may make ten revolutions per minute. It will, however, be understood that these particulars may vary, and necessarily must vary, with the material to be bored. Other forms of hydraulic engines than those shown may also be employed for rotating the cylinder $c$.

When it is desired to withdraw the boring-rod from the bore, the stop-cock on pipe $f$ is opened and the valve $r$ closed, when the cylinder $c$ and engines may be made to slide backward to add another section of boring-rod.

Having now described my invention, what I claim, and desire to secure by Letters Patent, is—

1. The combination, with the boring apparatus, of a hydraulic support, I, substantially as described, and for the purpose set forth.

2. The hydraulic stand I, consisting of the cylinder $i$, piston $i^1$, and pipe $i^2$, in combination with the pipe $q$, substantially as described.

3. In a rock-boring machine, a sectional tubular boring-rod, carrying an annular boring-tool, and a suitable driving-engine, in combination with a stand or support for the same, constructed and arranged to hold the mechanism in proper working position by means of power supplied thereto from a distance, substantially as described.

4. The combination, with the stand I, of a suitable driving-engine and a sectional tubular boring-rod, carrying an annular boring-tool, so constructed as to be operated by the same power, supplied from a distance, but independently of each other, the boring rod and tool having a rotary motion imparted thereto, and adapted to reciprocate together with the driving mechanism upon said support, substantially as described, for the purpose specified.

5. The combination of the sectional boring-rod $b$, the cylinder $c$, piston $d$, hydraulic engines $l$, worm-shaft $m$, worm $m'$, and worm-wheel $n$, all constructed and operating substantially as set forth.

6. The combination, with the exhaust-ports of the hydraulic engines $l\ l$, of the piston $d$ and pipe $u$ of the cylinder $c$ and the hollow boring-rod $b$, as and for the purposes specified.

7. In combination, with the cylinder $c$, of the piston $d$ and sleeve A, having ports $a^1$ and the pipes $e\ p$, substantially as and for the purposes specified.

8. The combination, with the cylinder $c$ and pipe $f$, the casing L, and hydraulic engines $l$ $l$, and the guides $k\ k$ of the piston $d$, sleeve or head A, and slides $k'\ k'$, substantially as and for the purposes specified.

9. The combination of the piston $d$ and cylinder $c$, forming annular space $h$ between them, of the pipe $g$ and head or sleeve A, having port $a^2$, substantially as described, for the purpose specified.

In witness that I claim the foregoing I have hereunto set my hand this 25th day of June, 1877.

ALFRED BRANDT.

Witnesses:
C. O. PAGET,
JOSEF VEL MORO.